United States Patent
Lim et al.

(10) Patent No.: US 12,531,075 B2
(45) Date of Patent: Jan. 20, 2026

(54) IMMERSIVE AUDIO PACKAGE

(71) Applicant: GOOGLE LLC, Mountain View, CA (US)

(72) Inventors: Sze Chie Lim, Mountain View, CA (US); Shawn Singh, Palo Alto, CA (US); Anjali Wheeler, Pacifica, CA (US); Jani Huoponen, Los Gatos, CA (US); Jan Skoglund, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 265 days.

(21) Appl. No.: 18/355,928

(22) Filed: Jul. 20, 2023

(65) Prior Publication Data

US 2024/0331709 A1 Oct. 3, 2024

Related U.S. Application Data

(60) Provisional application No. 63/492,927, filed on Mar. 29, 2023.

(51) Int. Cl.
*G10L 19/02* (2013.01)
*G06F 3/16* (2006.01)

(52) U.S. Cl.
CPC .............. *G10L 19/02* (2013.01); *G06F 3/162* (2013.01); *G06F 3/165* (2013.01)

(58) Field of Classification Search
CPC ....... G10L 19/02; G10L 19/167; G06F 3/162; G06F 3/165
See application file for complete search history.

(56) References Cited

U.S. PATENT DOCUMENTS 9,818,448 B1  11/2017  Sexton et al.
2006/0198528 A1  9/2006  Tuffy et al.
(Continued)

FOREIGN PATENT DOCUMENTS

CN  114026878 B  *  4/2024  ............. H04N 19/70
CN  114631325 B  *  1/2025  ............ H04N 19/597

OTHER PUBLICATIONS

Quackenbush, Schuyler R., and Jürgen Herre. "MPEG standards for compressed representation of immersive audio." Proceedings of the IEEE 109.9 (2021): 1578-1589. (Year: 2021).*

(Continued)

*Primary Examiner* — Anne L Thomas-Homescu
(74) *Attorney, Agent, or Firm* — Brake Hughes Bellermann LLP

(57) ABSTRACT

A method including receiving first audio data, receiving second audio data, compressing the first audio data as first compressed audio data, compressing the second audio data as second compressed audio data, generating a codec dependent container including a parameter associated with compressing the first audio data, compressing the second audio data, a reference to the first compressed audio data, and a reference to the second compressed audio data, generating a codec agnostic container including at least one parameter representing time-varying data associated with playback of the first audio data and the second audio data, and generating an audio package including the codec dependent container and the codec agnostic container.

20 Claims, 9 Drawing Sheets

(56) References Cited

U.S. PATENT DOCUMENTS

| | | | |
|---|---|---|---|
| 2016/0117159 A1* | 4/2016 | Balko | G06F 9/44526 |
| | | | 717/177 |
| 2016/0196830 A1* | 7/2016 | Riedmiller | G10L 19/018 |
| | | | 704/500 |
| 2016/0212482 A1* | 7/2016 | Balko | H04N 21/42203 |
| 2021/0375297 A1 | 12/2021 | Bruhn et al. | |

OTHER PUBLICATIONS

Herre, Jürgen, and Schuyler R. Quackenbush. "MPEG-H 3D audio: Immersive audio coding." Acoustical Science and Technology 43.2 (2022): 143-148. (Year: 2022).*

Herre, Jürgen, et al. "MPEG-H 3D audio—The new standard for coding of immersive spatial audio." IEEE Journal of selected topics in signal processing 9.5 (2015): 770-779. (Year: 2015).*

Niamut, Omar A., et al. "Towards a format-agnostic approach for production, delivery and rendering of immersive media." Proceedings of the 4th ACM Multimedia Systems Conference. 2013. (Year: 2013).*

"Fraunhofer Uphear Immersive Audio Virtualizer", Fraunhofer; https://www.iis.fraunhofer.de/en/ff/amm/consumer-electronics/uphear-virtualizer.html, Apr. 2021, 5 pages.

Herre, et al., "MPEG-H 3D Audio: Immersive Audio Coding", Acoust. Sci. & Tech. 43, 2; Invited Paper, 2022, pp. 143-148.

\* cited by examiner

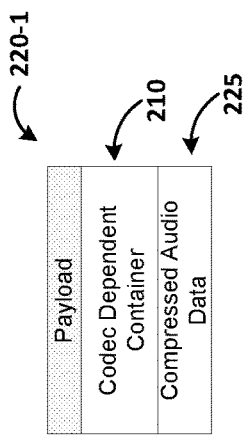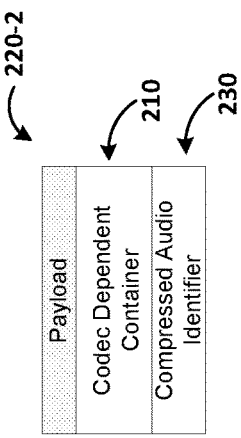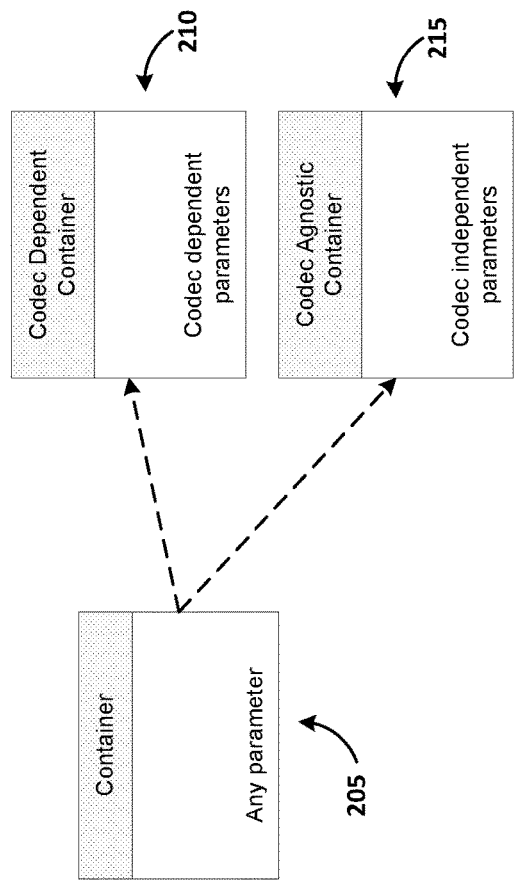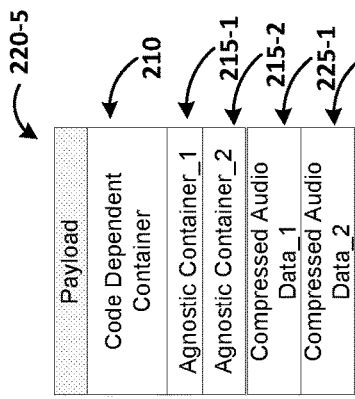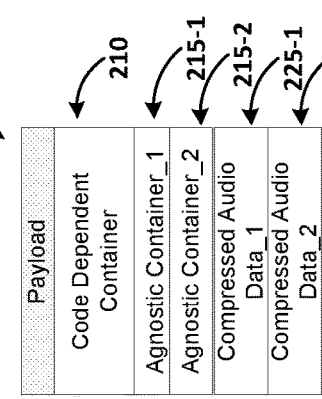

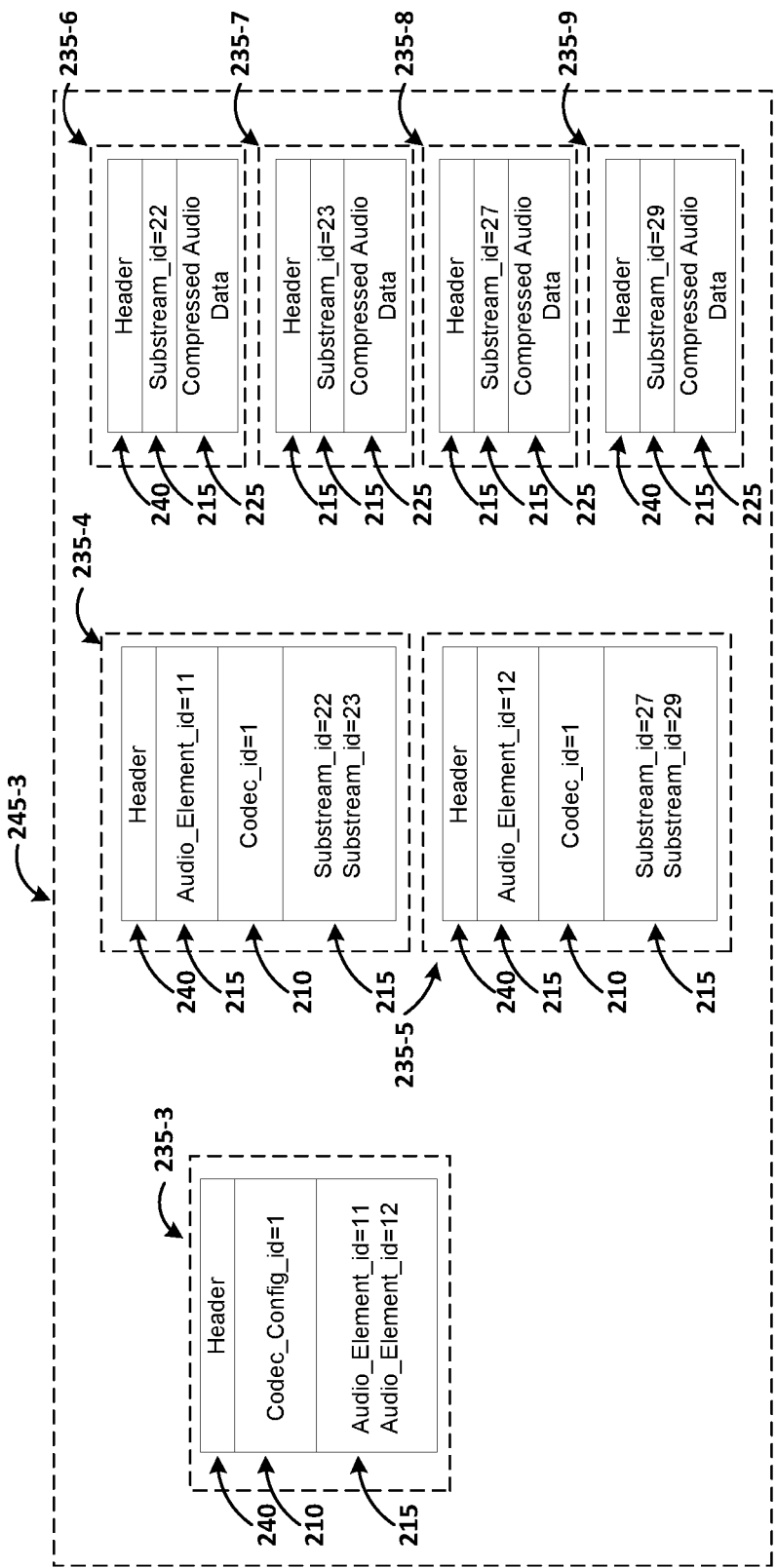
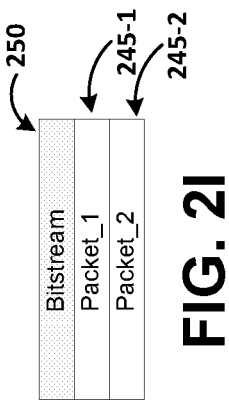
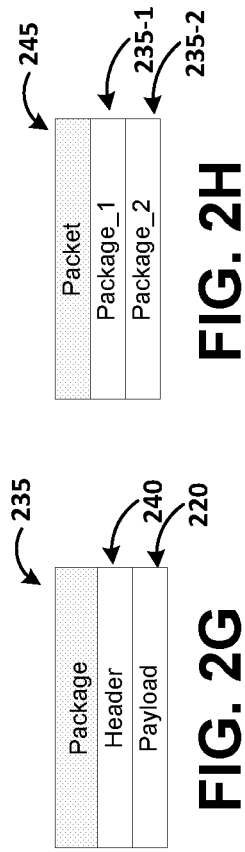

IMMERSIVE AUDIO PACKAGE

CROSS REFERENCE TO RELATED APPLICATION

This application claims the benefit of U.S. Provisional Application No. 63/492,927, filed Mar. 29, 2023, the disclosure of which is incorporated herein by reference in its entirety.

FIELD

Implementations relate to generating an audio package for playing back audio on a playback device.

BACKGROUND

Streaming audio data can include streaming audio to a playback device. The playback device can include one (e.g., mono) or more (e.g., stereo, surround sound) speakers. Therefore, the streaming audio data can include one or more channels. Conventional channel-based audio can have one audio signal mapped to every speaker.

SUMMARY

An immersive audio (IA) package disclosed herein is designed to represent IA for presentation on a wide range of devices in both dynamic streaming and offline applications. These applications include internet audio streaming, multicasting/broadcasting services, file download, gaming, communication, virtual and augmented reality, and others. In these applications, audio may be played back on a wide range of devices, e.g., headsets, mobile phones, tablets, TVs, sound bars, home theater systems and big screen. Streaming can include an audio package having a number of coded audio substreams and container(s) including information that describes how to decode, render, and mix the substreams to generate an audio signal for playback. The containers separate codec-agnostic parameters from codec-specific parameters, which enables creator control over the timing of the automation data, enabling bitstream manipulations such as transcoding, merging and concatenation without requiring that automation data is additionally re-timed or re-partitioned. The IA package including streaming audio is codec-agnostic; any supported audio codec may be used to code the audio substreams. The containers also enable loudness control flexibility when merging and/or mixing audio channels, streams, and/or substreams.

In a general aspect, a device, a system, a non-transitory computer-readable medium (having stored thereon computer executable program code which can be executed on a computer system), and/or a method can perform a process with a method including receiving first audio data, receiving second audio data, compressing the first audio data as first compressed audio data, compressing the second audio data as second compressed audio data, generating a codec dependent container including a parameter associated with compressing the first audio data, compressing the second audio data, a reference to the first compressed audio data, and a reference to the second compressed audio data, generating a codec agnostic container including at least one parameter representing time-varying data associated with playback of the first audio data and the second audio data, and generating an audio package including the codec dependent container and the codec agnostic container.

In another general aspect, a device, a system, a non-transitory computer-readable medium (having stored thereon computer executable program code which can be executed on a computer system), and/or a method can perform a process with a method including receiving an audio package including a first identifier corresponding to first compressed audio data, a second identifier corresponding to second compressed audio data, a codec dependent container and a codec agnostic container, the codec agnostic container including at least one parameter value including time-varying data associated with playback of the first compressed audio data the second compressed audio data, obtaining the first compressed audio data using the first identifier, generating first audio data by decompressing the first compressed audio data based on the codec dependent container, obtaining the second compressed audio data using the second identifier, generate second audio data by decompressing the second compressed audio data based on the codec dependent container, generating an audio presentation based on the codec dependent container, and the codec agnostic container, and playing back the first audio data and the second audio data based on the audio presentation.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

FIG. 2A illustrates a block diagram of containers according to an example implementation.

FIGS. 2B, 2C, 2D, 2E, and 2F illustrate block diagrams of a payload according to an example implementation.

FIG. 2G illustrates a block diagram of a package according to an example implementation.

FIG. 2H illustrates a block diagram of a packet according to an example implementation.

FIG. 2I illustrates a block diagram of a bitstream according to an example implementation.

FIG. 2J illustrates another block diagram of a packet according to an example implementation.

Figure 1A:
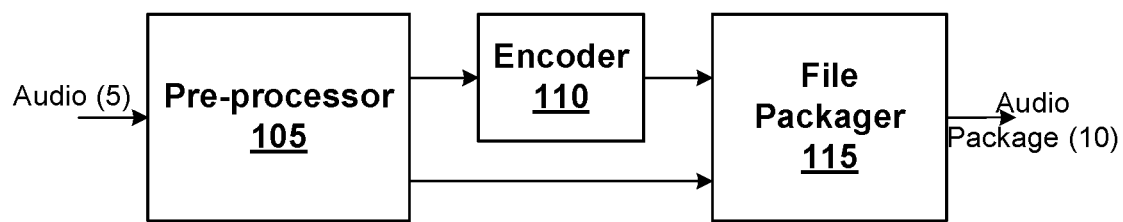
FIG. 1A illustrates a block diagram of a data flow for generating an audio package according to an example implementation.

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

Techniques for describing audio compressing, decompressing, and playback information in various existing streaming and/or storing formats can be inconsistent and insufficient for describing three-dimensional (3D) audio scenes. The 3D audio scenes can include immersive and rich audio scenes created in Digital Audio Workstations (DAWs). The 3D audio scenes can have configurations that cannot be expressed as a set of parameters for transport over a streaming format. Currently, techniques used to convey 3D audio scenes in a streaming system using existing codec-agnostic audio streams do not exist. Therefore, a need for a technique configured to express audio processing parameters for streaming 3D audio scenes is needed. In an example implementation, the technique can be flexibly automated to reflect a content creators' intent. In an example implementation, the disclosed codec-agnostic containers enable decoupling timing or other audio parameters from a single audio stream's frame rate or from the audio codec used. In addition, existing techniques for routing 3D audio scenes from content creation through distribution through user playback devices often require processing by more than one service and/or system. This can involve bitstream manipulation such as transcoding, multiplexing, merging and concatenation, or extracting part of the bitstream.

Currently, there is no technique for representing asynchronous multi-stream audio representations using a common standalone representation that is agnostic of container formats or transport formats. Therefore, example implementations further describe a technique configured to generate asynchronous multi-stream audio representations using a common standalone representation that is agnostic of container formats or transport formats. Accordingly, example implementations describe generating an audio package, including coded audio substreams and containers including parameters, that describes how to decode, render, and mix the substreams to generate an audio signal for playback. Example implementations describe containers including synchronous and asynchronous audio streams/substreams as a synchronous and an asynchronous multi-stream package. The multi-stream package can include audio packages configured to enable merging and processing of one or more input streams, without requiring transcoding and retiming to align the input streams.

Asynchronous multi-streams refer to audio streams that do not have the same frame sizes or do not have aligned frame boundaries. Existing technologies require audio streams that have the same frame sizes and have aligned frame boundaries (e.g., synchronous). Example implementations describe techniques for communicating multi-stream audio including asynchronous multi-streams.

Example implementations describe audio streams including an audio package with codec-agnostic containers. The audio package can include multiple audio streams that are coded with two or more codecs. The audio package can convey immersive audio from content creation, multiple applications, and networked audio manipulations, through distribution, operating system audio frameworks, to a user's playback system.

DAW's can allow automation of audio production where the DAW automatically performs tasks over time. The tasks can include, for example, changing automation data (e.g., equalizer, volume, sound location, and the like). Example implementations describe an audio package including automation data. The automation data can be decoupled from the audio codec using codec agnostic containers including the automation data. In other words, the automation data can be codec agnostic. The automation data can be represented in a block-based manner where a time interval of the block is decoupled from a time interval of the audio frame. The automation data block time interval can be smaller or larger than the audio frame time interval. Because the time interval of the automation data in the disclosed audio package can be decoupled from any of the audio streams, the automation data can be asynchronous. For example, the automation data does not require alignment at the frame boundaries. Example implementations can describe how the automation data value can vary arbitrarily over time according to curves defined by, for example, Bezier parameters.

Example implementations can enable streaming, seeking, and joining in order to determine an automation parameter value at any point in time, even if the value is not explicitly provided at that particular time. Example implementations can enable changing, modifying, and/or updating parameters including automation parameters.

FIG. 1A illustrates a block diagram of a data flow for generating an audio package according to an example implementation. As shown in FIG. 1A, the data flow includes a preprocessor 105, an encoder 110, and a file packager 115. The flow of FIG. 1A is performed before audio is transmitted/streamed to a receiving device. The output of the flow of FIG. 1A, the audio package, can be stored, transmitted/streamed, stored before transmission/streaming, and/or the like.

The preprocessor 105 is configured to take audio data 5 as input and generate a container(s) associated with the audio data 5. The container(s) can include at least one parameter. The at least one parameter can be associated with compressing/decompressing the audio data 5. The at least one parameter can be associated with other information (e.g., not associated with compressing/decompressing the audio data 5). In an example implementation, the preprocessor 105 can be configured to generate a codec dependent (e.g., associated with compressing/decompressing the audio data 5) container and the preprocessor 105 can be configured to generate a codec agnostic container. For example, the preprocessor 105 can be configured to generate a codec dependent container including parameters and data (e.g., values/variables for the parameters) associated with the codec used to compress/decompress the audio data 5. For example, the preprocessor 105 can be configured to generate a codec agnostic container including parameters and data (e.g., values/variables for the parameters) associated with a presentation (e.g., playback) of the audio data 5. For example, the codec agnostic container can include parameters including time-varying data associated with playback of the audio data 5. Time-varying data can include any data associated with the audio data 5 that can vary within/between audio frames within an audio package.

The audio data 5 can be recorded audio, stored audio, live audio, and the like. The audio data 5 can include audio data from one or more channels, one or more sources, and/or the like. For example, the audio data 5 can include audio data associated with at least two channels (e.g., left, and right channels or stereo). For example, the audio data 5 can include audio data associated with a plurality of channels (e.g., surround sound channels, ambisonics channels, and the like). The encoder 110 can be configured to compress the audio data 5. The encoder 110 can be configured to compress the audio data 5 using any codec (e.g., MPEG, Opus, Lyra, AAC, and the like).

The file packager 115 can be configured to generate an audio package 10. The audio package 10 can include a header and a payload. The header can include information (e.g., parameters) and data (e.g., values/variables for the parameters) associated information (e.g., parameters) and data (e.g., values/variables for the parameters) associated with the payload. The payload can include at least one container. For example, the payload can include a codec dependent container(s) and/or a codec agnostic container(s). The payload can include at least one compressed audio data and/or a link(s) to (or references to) the respective compressed audio data. As mentioned above, the output of the flow of FIG. 1A, the audio package (10), can be streamed. Streaming can include generating a packet including at least one audio package (10), generating a bitstream including at least one audio packet, and transmitting/streaming the bitstream to at least one device configured to playback the audio data 5 (or reconstructed audio data 5) using the audio presentation.

Figure 1B:
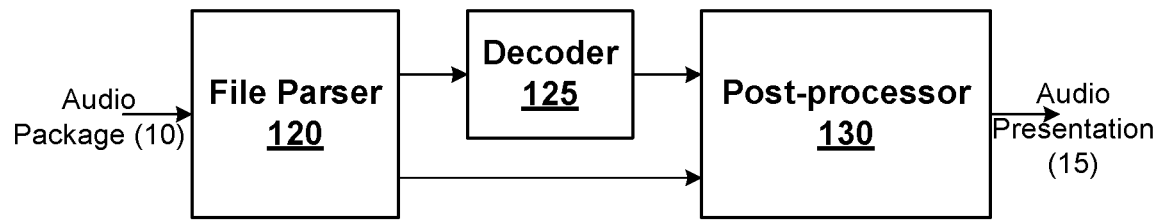
FIG. 1B illustrates a block diagram of a data flow for generating an audio presentation according to an example implementation.

FIG. 1B illustrates a block diagram of a data flow for generating an audio presentation according to an example implementation. As shown in FIG. 1B, the data flow includes a file parser 120, a decoder 125, and a post processor 130. The flow of FIG. 1B is performed before audio is played back on a receiving device. The audio presentation 15 generated by the flow of FIG. 1B can be stored or played back by a computing device, e.g., a receiving device. The audio package 10 can be included in a streaming bitstream received by the computing device. The bitstream can include at least one audio packet and the at least one audio packet can include at least one audio package 10.

The file parser 120 can be configured to receive an audio package 10 and parse the audio package 10 into a header and a payload. The file parser 120 can be further configured to parse the payload into audio data and at least one container. The audio data can include compressed audio data. The at least one container can include a codec dependent container(s) and/or a codec agnostic container(s), each described above.

The decoder 125 can be configured to decompress audio data. For example, the decoder 125 can be configured to generate audio data by decompressing compressed audio data using an audio codec. The codec dependent container can include information associated with the audio codec. For example, the codec dependent container can include a parameter including the codec (e.g., used to compress the audio data). Therefore, the decoder 125 can be configured to generate audio data by decompressing compressed audio data based on a parameter included in the codec dependent container.

The post processor 130 can be configured to generate an audio presentation 15. The audio presentation 15 can be generated based on the codec agnostic container(s). The audio data (e.g., the decompressed or reconstructed audio data) can be played back based on (or using) the audio presentation 15. In some implementations, the post processor 130 can be configured to generate an audio presentation 15 using parameters included in the codec dependent container. Therefore, in some implementations, the audio presentation 15 can be generated based on the codec agnostic container(s) and the codec dependent container.

FIG. 2A illustrates a block diagram of containers according to an example implementation. In this example, a container 205 can include at least one parameter. The at least one parameter included in the container 205 can be any parameter associated with information of any kind having any audio role. In an example implementation, parameters can be in different containers based on a role of the parameter. For example, as shown in FIG. 2A, the parameters can be in a codec dependent container 210 and a codec agnostic container 215. The codec dependent container 210 can include at least one parameter that has a role related to compression and/or decompression of audio data. For example, the codec dependent container 210 can include a parameter that includes the codec (e.g., MPEG, Opus, Lyra, AAC, and the like) used by, for example, encoder 110 to compress, for example, audio data 5. The codec agnostic container 215 can include at least one parameter that has a role unrelated to compression and/or decompression of audio data. For example, the codec agnostic container 215 can include a parameter that includes a loudness (e.g., volume) of the audio data used during playback of the audio data. In an example implementation, the codec agnostic container 215 can include information associated with two or more audio streams and each of the audio streams can have an associated loudness parameter with a respective same or different value. For example, the codec agnostic container 215 can include parameters including time-varying data associated with playback of the audio data 5. Time-varying data can include any data associated with the audio data 5 that can vary within/between audio frames.

FIGS. 2B, 2C, 2D, 2E, and 2F illustrate block diagrams of a payload according to an example implementation. As shown in FIG. 2B, a payload 220-1 can include a codec dependent container 210 and a compressed audio data 225. As shown in FIG. 2C, a payload 220-2 can include a codec dependent container 210 and a compressed audio identifier 230. In an example implementation, a compressed audio identifier 230 can be a link(s) to (or reference(s) to) a compressed audio data 225. As shown in FIG. 2D, a payload 220-3 can include a codec dependent container 210, a codec agnostic container 215, and a compressed audio data 225. As shown in FIG. 2E, a payload 220-4 can include a codec dependent container 210, a codec agnostic container 215, and a compressed audio identifier 230. In an example implementation, a compressed audio identifier 230 can be a link(s) to (or reference(s) to) a compressed audio data 225.

As shown in FIG. 2F, a payload 220-5 can include a codec dependent container 210, a codec agnostic container 215-1, a codec agnostic container 215-2, a compressed audio data 225-1, and a compressed audio data 225-2. In this example implementation, one codec dependent container 210 can be included in the payload 220-5 because compressed audio data 225-1 and compressed audio data 225-2 use the same (or substantially the same) codec dependent parameters. In this example implementation, two codec agnostic containers 215 can be included in the payload 220-5 because compressed audio data 225-1 and a compressed audio data 225-2 have at least one codec independent parameter (e.g., a volume is different for each of compressed audio data 225-1 and a compressed audio data 225-2). Although not shown, a payload similar to the payload 220-5 could include two compressed audio identifiers 230 as links to (or references to) compressed audio data 225-1 and compressed audio data 225-2.

FIG. 2G illustrates a block diagram of a package according to an example implementation. As shown in FIG. 2G, a package 235 can include a header 240 and a payload 220. The header 240 can include information (e.g., parameters and data (e.g., values/variables for the parameters) associated with the payload 220. FIG. 2H illustrates a block diagram of a packet according to an example implementation. As shown in FIG. 2H, a packet 245 can include at least one package 235. For example, the packet 245 can include package 235-1 and package 235-2. FIG. 2I illustrates a block diagram of a bitstream according to an example implementation. As shown in FIG. 2I, a bitstream 250 can include at least one packet 245. For example, the bitstream 250 can include packet 245-1 and packet 245-2.

FIG. 2J illustrates another block diagram of a packet according to an example implementation. As mentioned above, a packet 245 can include at least one package 235. Therefore, a packet 245 can include a portion (e.g., a stream, a substream, a channel, and the like) of the information and data associated with the playback of audio. In the example implementation illustrated in FIG. 2J, the packet 245-3 includes package 235-3, 235-4, 235-5, 235-6, 235-7, 235-8, 235-9. The package 235-3 includes a header 240 including information associated with a payload including a codec dependent container 210 and a codec agnostic container 215. The codec dependent container 210 of the package 235-3 includes a codec configuration (codec_config) identification (id) parameter with a value set to one (1). The codec agnostic container 215 of the package 235-3 includes audio element (audio_element) identification (id) parameters with values of 11 and 12. The parameter codec_config_id can be used to indicate that audio_element_id=11 and audio_element_id=12 were coded using codec_config_id=1. The parameters audio_element_id=11 and 12 and the parameter codec_config_id=1 can be links or references to other packages.

The package 235-4 includes a header 240 including information associated with a payload including a codec dependent container 210 and two codec agnostic containers 215. The codec dependent container 210 of the package 235-4 includes a codec (codec) identification (id) parameter with a value set to one (1). One of the codec agnostic containers 215 of the package 235-4 includes audio element (audio_element) identification (id) parameters with a value of 11. The audio element (audio_element) identification (id) parameters with a value of 11 can be a link between the package 235-3 and the package 235-4, where audio_element_id=11 of package 235-3 operates as a link to package 235-4. The other codec agnostic containers 215 of the package 235-4 includes substream identification (id) parameters with values of 22 and 23. The parameter codec can be used to indicate that audio_element_id=11 was coded using codec=1 (e.g., MPEG, Opus, Lyra, AAC, and the like). The parameters substream_id=22 and 23 and the parameter codec_id=1 can be links or references to other packages.

The package 235-5 includes a header 240 including information associated with a payload including a codec dependent container 210 and two codec agnostic containers 215. The codec dependent container 210 of the package 235-5 includes a codec (codec) identification (id) parameter with a value set to one (1). One of the codec agnostic containers 215 of the package 235-5 includes audio element (audio_element) identification (id) parameters with a value of 12. The audio element (audio_element) identification (id) parameters with a value of 12 can be a link between the package 235-3 and the package 235-5, where audio_element_id=12 of package 235-3 operates as a link to package 235-5. The other codec agnostic containers 215 of the package 235-5 includes substream identification (id) parameters with values of 27 and 29. The parameter codec can be used to indicate that audio_element_id=12 was coded using codec=1 (e.g., MPEG, Opus, Lyra, AAC, and the like). The parameters substream_id=27 and 29 and the parameter codec_id=1 can be links or references to other packages.

The package 235-6 includes a header 240 including information associated with a payload including a codec dependent container 210 and compressed audio data 225. The substream identification (id) parameter with a value of 22 can be a link between the package 235-4 and the package 235-6, where substream_id=22 of package 235-4 operates as a link to package 235-6. The package 235-7 includes a header 240 including information associated with a payload including a codec dependent container 210 and compressed audio data 225. The substream identification (id) parameter with a value of 23 can be a link between the package 235-4 and the package 235-7, where substream_id=22 of package 235-4 operates as a link to package 235-7.

The package 235-8 includes a header 240 including information associated with a payload including a codec dependent container 210 and compressed audio data 225. The substream identification (id) parameter with a value of 27 can be a link between the package 235-5 and the package 235-8, where substream_id=27 of package 235-5 operates as a link to package 235-8. The package 235-9 includes a header 240 including information associated with a payload including a codec dependent container 210 and compressed audio data 225. The substream identification (id) parameter with a value of 29 can be a link between the package 235-5 and the package 235-9, where substream_id=29 of package 235-5 operates as a link to package 235-9. The compressed audio data 225 of package 235-6, package 235-7, package 235-8, and package 235-9 can include the audio data associated with package 235-3.

Figure 3A:
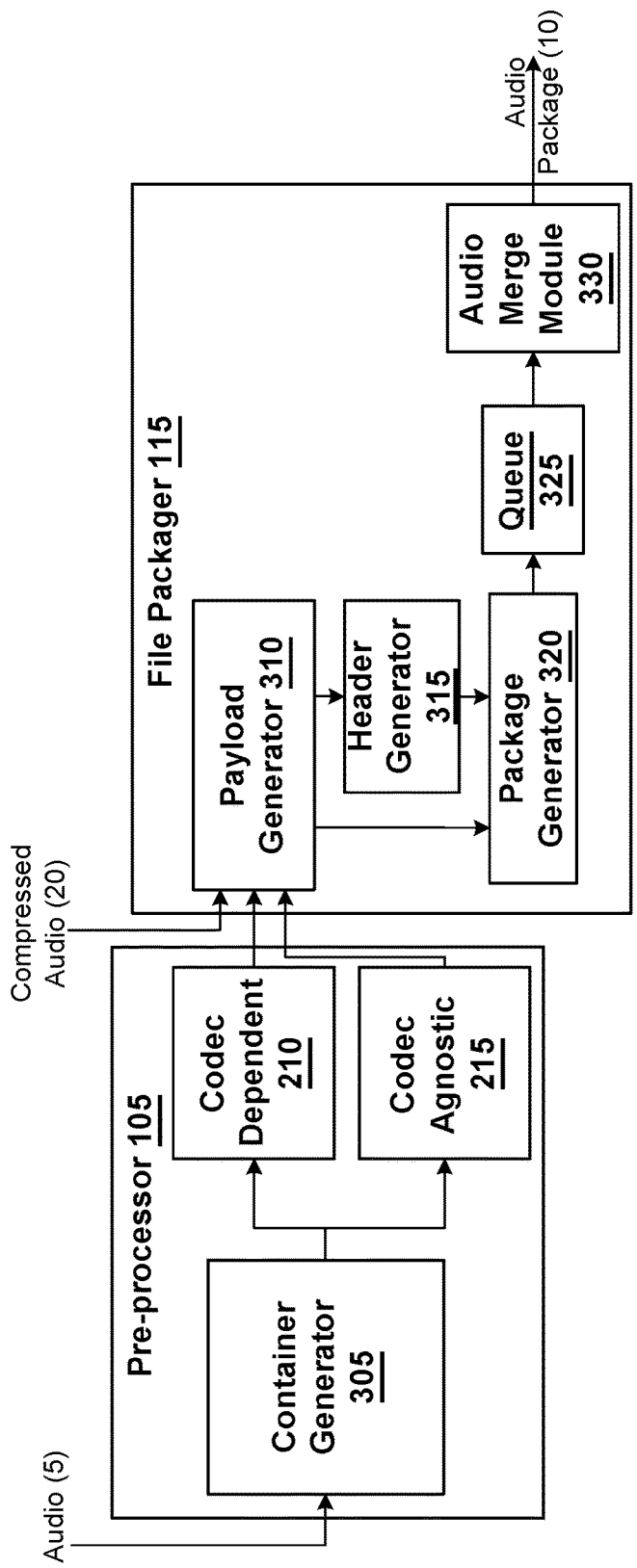
FIG. 3A illustrates a block diagram of a data flow for generating an audio package according to an example implementation.

FIG. 3A illustrates a block diagram of a data flow for generating an audio package according to an example implementation. As shown in FIG. 3A, the data flow includes the preprocessor 105 and the file packager 115. The preprocessor 105 includes a container generator 305 block, a codec dependent container 210 block, and a codec agnostic container 215 block. The file packager 115 includes a payload generator 310 block, a header generator 315 block, a package generator 320 block, a queue 325 block, and an audio merge module 330 block. The container generator 305 is configured to generate the codec dependent container 210 and the codec agnostic container 215 (each described above).

Conventional channel-based audio can have one audio signal mapped to every physical speaker. Example implementations include containers (e.g., the codec dependent container 210 and the codec agnostic container 215) used to decouple the physical speaker layouts from the mixing and content creation. For example, a container can include parameters as a description of the sound, which can then be reproduced on any physical loudspeaker layout. In an example implementation, the codec agnostic container 215 can include parameters representing audio production choices (e.g., choices made by a mix engineer). The parameters can be modified during playback. For example, object panning or location automation, gain controls and DRC controls, and some degree of EQ, delay, and reverb effects that are part of spatial rendering can be changed during playback by updating (or modifying) a value associated with the relevant parameter (or parameter value). Sometimes parameters and data (e.g., values/variables associated with the parameters) is referred to as metadata.

Rendering algorithms can be configured to map a virtual space to a listener's physical audio system. Physical systems can be, for example, multi-channel home theaters, sound bars, stereo, earbuds, and/or portable speakers (which may often be mono). Example implementations include techniques for rendering depending on physical speaker layouts. For example, a codec agnostic container 215 can include parameters for direct mapping the audio channels to physical loudspeakers, downmix and panning methods (e.g., mapping audio channels to multiple physical channels, gain weighted), soundbar rendering spatialization techniques for sound like surround sound setup with only one bar of speakers at the front of the room, and/or head tracked binaural spatialization techniques.

Example implementations include techniques that indicate a loudness information of two or more audio streams within a bitstream (e.g., a merged bitstream). For example, a codec agnostic container 215 can include parameters to describe multiple sets of loudness information, each associated with a sub-mix of audio substreams. For example, the codec agnostic container 215 can include parameters to describe how the loudness of the sub-mixes can be normalized before summation to create a final mix. The relative gain of each submix contributing to the final mix can be adjusted using gain parameters that are set during content creation and/or during playback. The parameters described below can be included in a codec agnostic container 215 to implement the above techniques.

The codec dependent container 210 can include codec dependent information about the audio data and/or audio playback. The codec dependent container 210 can include parameters representing a codec configuration identification, a codec identification, a decoder configuration identification, a number of samples per frame, a roll distance, a number of audio elements (e.g., audio channels, audio streams, audio substreams and/or the like), an audio element identification, and the like. The codec configuration identification can indicate a unique ID in a bitstream for a given codec configuration. The codec identification can be a code to identify the codec used to generate the audio substreams. The decoder configuration can specify a set of codec parameters to decode an audio substream for the given codec identification. The number of samples per frame can indicate the frame length, in samples, of the raw coded audio. In an example implementation the audio data 5 includes two or more substreams and a first substream can have a first frame length and the second substream can have a second frame length. The first frame length can be different than the second frame length. The roll distance can be a signed integer that gives the number of frames to be decoded in order for a frame to be decoded correctly. The number of audio elements can specify the number of audio elements that refer to the codec configuration. The audio element identification can specify the unique ID associated with the specific audio element that refers to the codec configuration. The codec dependent container 210 can include other information not discussed above. However, additional information included in a codec dependent container 210 may be discussed below.

A codec agnostic container 215 can include a parameter block(s). The parameter block(s) can include a parameter identification, a duration, a number of segments, a constant segment interval, a parameter definition type, and the like. The parameter identification can indicate a unique identification that is associated with a specific parameter definition. A parameter definition can refer to, for example animation, gain, demixing, and the like. The duration can specify the duration for which the parameter block is valid and applicable. The number of segments can specify the number of different sets of parameter values specified in the parameter block, where each set describes a different segment of the timeline, contiguously. The constant segment interval can specify the interval of each segment, in the case where all segments have equal intervals. There can be a run-time function configured to map the parameter identification to a registered parameter definition type. The parameter block(s) can include other data not discussed above. However, additional parameter block(s) may be discussed below.

A codec agnostic container 215 can include an audio frame(s) or a reference to an audio frame(s). For example, parameters representing an audio frame can include a substream identification, a coded frame size, an audio frame, and the like. The substream identification can indicate a unique identification in a bitstream for a given substream. The coded (e.g., compressed) frame size can be the size of the audio frame in bytes. The audio frame can be the compressed audio data for the frame or a reference to the compressed audio data for the frame.

A codec agnostic container 215 can include a synchronization parameter(s). The synchronization parameters(s) can include parameters representing a global offset, a number of identifications, an identification, a datatype, a reinitialize decoder, a relative offset, a concatenation rule, and the like. The global offset can specify the offset that can be applied to specified substreams and parameters The number of identifications can specify the number of substream and parameter identifications for the global offset. The identification can specify the unique identification associated with the substream or parameter that is being referred to. The datatype can specify the type of data that is being referred to. The reinitialize decoder can be used to specify the behavior of a decoder when encountering gaps in the audio substream. The relative offset can be the offset that can be applied to the first audio frame or parameter block with the referenced identification that comes after this synchronization block. The relative offset can describe the position of audio and parameters in a local frame of reference. The concatenation rule can specify a type of concatenation rule that is applied to position the audio frames and parameters that happened after a synchronization block with respect to the timeline before the synchronization block. The synchronization parameter(s) can include other data not discussed above. However, additional synchronization parameter(s) may be discussed below.

A codec agnostic container 215 can include parameters associated with a scalable channel layout configuration. The scalable channel layout configuration can include information associated with the configuration of scalable channel audio. The scalable channel layout configuration can include parameters representing a channel group, a number of layers, a channel audio layer configuration, a loudspeaker layout, an output gain is present indicator, a reconstruction gain is present indicator, a loudness, an output gain indicator, an output gain, and the like. The channel group can be a set of substreams configured to provide a spatial resolution of audio contents by itself or configured to provide an enhanced spatial resolution of audio contents by combining with the preceding channel groups within the audio frames. The number of layers can indicate the number of channel groups for scalable channel audio. The channel audio layer configuration can be a data structure that provides the information regarding the configuration of a channel group(s) for scalable channel audio. The loudspeaker layout can indicate the channel layout for the channels to be reconstructed from the precedent channel group(s) and the current channel group(s) among channel group(s) for scalable channel audio. The output gain is present indicator can indicate whether output gain information fields for the channel group(s) is present. The reconstruction gain is present indicator can indicate whether reconstruction gain information fields for the channel group(s) is included in the channel group(s) gain information block. The loudness can indicate the loudness value of the downmixed channels, for the channel layout, which is indicated by loudspeaker layout, from the original channel audio. The output gain indicator can indicate the channels which output gain is applied to. The output gain can indicate the gain value to be applied to the mixed channels which are indicated by the output gain indicator. The scalable channel layout configuration can include other data not discussed above. However, additional scalable channel layout configuration information may be discussed below.

The codec agnostic container 215 can include parameters associated with an ambisonics configuration. The ambisonics configuration can include information associated with the ambisonics audio. The ambisonics configuration can include parameters representing an ambisonics mode, an output channel count, a substream count, a channel mapping, a coupled substream count, a de-mixing matrix, and the like. The ambisonics mode can specify the method of coding Ambisonics. The output channel count can specify a number of channels or channel count. The substream count can specify a number of audio substreams. The channel mapping can indicate a channel mapping associated with, for example speakers. The coupled substream count can specify the number of referenced substreams that are coded as coupled stereo channels. The de-mixing matrix can also indicate a channel mapping associated with, for example speakers. The ambisonics configuration can include other information not discussed above. However, additional ambisonics configuration information may be discussed below.

The codec agnostic container 215 can include information associated with a de-mixing mode to be used to reconstruct output channel audio according to the loudspeaker layout. The codec agnostic container 215 can include a parameter(s) representing the reconstruction gain. The codec agnostic container 215 can include a parameter(s) representing the gain values used for a down-mixer. The codec agnostic container 215 can include parameters representing the mix target, mix loudness, and mix gain. The codec agnostic container 215 can include parameters representing other information not discussed above. However, additional parameter(s) included in the codec agnostic container 215 may be discussed below.

In some implementations, the codec associated with the codec represented by the codec identification can have limitations associated with parameters that would be included in a codec agnostic container 215. For example, an Opus codec may be limited to two (2) channels. Therefore, if the codec represented by the codec identification is Opus, the channel count (set equal to two) could be included in the codec dependent container 210 (e.g., by the container generator 305) instead of the codec agnostic container 215. In an example implementation, any information and/or parameters (described above) that are not in the codec dependent container 210 can be in the codec agnostic container 215.

The file packager 115 can include a payload generator 310 block, a header generator 315 block, a package generator 320 block, a queue 325 block, and an audio merge module 330 block. The package generator 320 can be configured to generate an audio package 10 including, the header 240, a codec agnostic container 215 and/or a codec dependent container 210. The codec agnostic container 215 block can include at least one parameter representing time-varying and/or non-time varying data associated with playback of the audio data.

In an example implementation, audio data from two or more channels, two or more streams, two or more substreams, and the like can be included in the audio package 10. After the package generator 320 generates a package, the package can be stored in the queue 325 (e.g., a memory). Then, each of the packages stored in the queue 325 can be merged by the audio merge module 330 to generate the audio package 10 that includes two or more channels, two or more streams, two or more substreams, and the like.

Figure 3B:
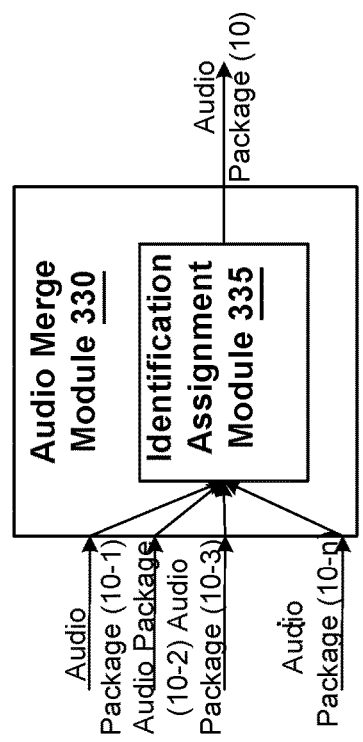
FIG. 3B illustrates a block diagram of a data flow for merging audio packages according to an example implementation.

FIG. 3B illustrates a block diagram of a data flow for merging audio packages according to an example implementation. As shown in FIG. 3B, the data flow includes an audio merge module 330 including an identification assignment module 335. In an example implementation, two or more of the audio package 10 (e.g., stored in queue 325) can be merged when streaming audio. For example, audio package 10-1, audio package 10-2, audio package 10-3, . . . , audio package 10-n can be merged to generate (e.g., a merged or updated) audio package 10. The identification assignment module 335 can be configured to add a parameter (e.g., to the header 240) to uniquely identify each audio package 10 (e.g., audio package 10-1, audio package 10-2, audio package 10-3, . . . , audio package 10-n. In an example implementation, an audio package 10 including one channel, one stream, one substreams, and the like can be merged with an audio package 10 including one or more channels, one or more streams, one or more substreams, and the like by the audio merge module 330 using substantially the same technique except that the audio packages 10 were previously output by the file packager 115.

In an example implementation, the audio merge module 330 can be configured to merge and/or mix two or more substreams. In an example implementation merging and/or mixing two or more substreams can impact (e.g., cause or necessitate the changing of) parameters included in a codec agnostic container. For example, the codec agnostic container can include a loudness parameter, a normalization parameter, a sampling rate parameter, a target sampling rate parameter, and/or the like, one or more of which can be changed, updated, added, and/or the like during a merge and/or mix process.

In an example implementation, a first audio package, including a first substream, and a second audio package, including a second substream, can be merged. Merging the first audio package with the second audio package can generate a third audio package. Merging the first audio package with the second audio package can include generating a normalization parameter associated with playback of the first substream and the second substream. The normalization parameter can be associated with loudness (e.g., a loudness normalization parameter). Loudness normalization can be associated with normalizing a perceived loudness during playback. Therefore, the normalization parameter can be used to normalize a perceived loudness during playback of the first substream and/or the second substream. Merging the first audio package with the second audio package can include adding the normalization parameter to the codec agnostic container.

In an example implementation, the merging of the first audio package with the second audio package can include mixing the first substream and the second substream as a third substream (e.g., make a single substream out of two or more substreams). The merging and/or mixing the first substream with the second substream can include generating the normalization parameter as a target (e.g., desired) loudness associated with playback of the third substream. The third substream can replace the first substream and the second substream in an audio presentation generated based on the third audio package. Mixing the first substream with the second substream can include determining a target (e.g., desired) sampling rate associated with playback of the first substream and the second substream. Mixing the first substream with the second substream can include determining whether a sample rate associated with the first substream or the second substream differs from the target sampling rate.

In response to determining the sample rate associated with the first substream or the second substream differs from the target sampling rate, the mixing the first substream with the second substream can include re-sampling the sampling rate of the first substream and/or the second substream. Re-sampling the sampling rate of at least one of the first substream, the second substream, and the third substream can include up-sampling and/or down-sampling the first substream and/or the second substream. Up-sampling can be configured to increase the sampling rate to the target sampling rate. Down-sampling can be configured to decrease the sampling rate to the target sampling rate. In an example implementation, the first substream can be associated with a surround speaker and the second substream can be associated with a top speaker, and when mixing the first substream with the second substream, the first substream and the second substream can be separately mixed.

Figure 4A:
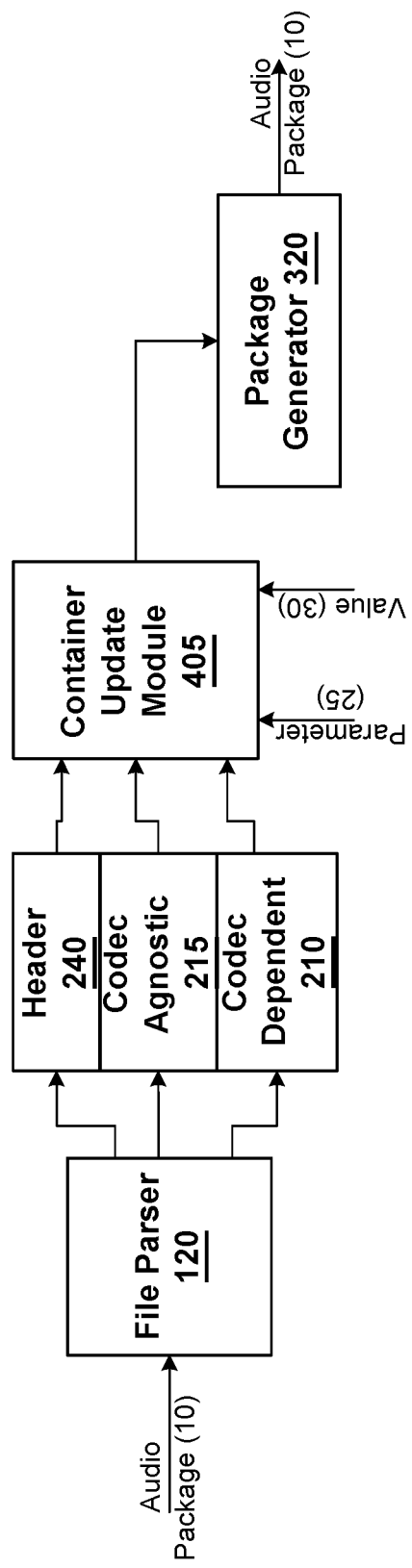
FIG. 4A illustrates a block diagram of a data flow for updating a container of an audio package according to an example implementation.

FIG. 4A illustrates a block diagram of a data flow for updating a container of an audio package according to an example implementation. As shown in FIG. 4A, the data flow includes the file parser 120, a header 240 block, a codec agnostic container 215 block, a codec dependent container 210 block, a container update module 405, and the package generator 320. In an example implementation, the file parser 120 receives as input an audio package 10. For example, the audio package 10 can be indicated as having a parameter associated with a container with an update prior to being input.

The file parser 120 can be configured to receive the audio package 10 and parse the audio package 10 into a header 240 and a payload. The file parser 120 can be further configured to parse the payload into at least one container. The at least one container can include at least one codec dependent container 210 and/or at least one codec agnostic container 215, each described above.

The container update module 405 can be configured to change a parameter associated with a container based on a parameter 25 and a value 30. For example, the container update module 405 can be configured to determine whether the parameter 25 is included in the codec agnostic container 215 and/or the codec dependent container 210. The container update module 405 can be configured to change, modify, update, and the like the parameter 25 in the determined codec agnostic container 215 and/or the determined codec dependent container 210 using the value 30.

For example, the codec agnostic container 215 can include parameters to describe multiple sets of loudness information, each associated with a sub-mix of audio substreams. For example, the codec agnostic container 215 can include parameters to describe how the loudness of the sub-mixes can be normalized before summation to create a final mix. The relative gain of each sub-mix contributing to the final mix can be adjusted using gain parameters that are set during content creation and/or during playback. Accordingly, a content creator can use the signal flow of FIG. 4A to modify a parameter representing a relative gain of each sub-mix. Accordingly, the sub-mix of audio substreams can be included in audio package 10. The parameter 25 can be the relative gain associated with the sub-mix and the value 30 can be adjusted relative gain. Similarly, a user of a playback device can use the signal flow of FIG. 4A to modify a parameter representing a relative gain of each sub-mix. Accordingly, the sub-mix of audio substreams can be included in audio package 10. The parameter 25 can be the relative gain associated with the sub-mix and the value 30 can be adjusted relative gain. Then, the package generator 320 can generate the audio package 10 as described above. The signal flow of FIG. 4A can be implemented in a software application configured to develop streaming audio and/or configured to playback streaming audio.

Figure 4B:
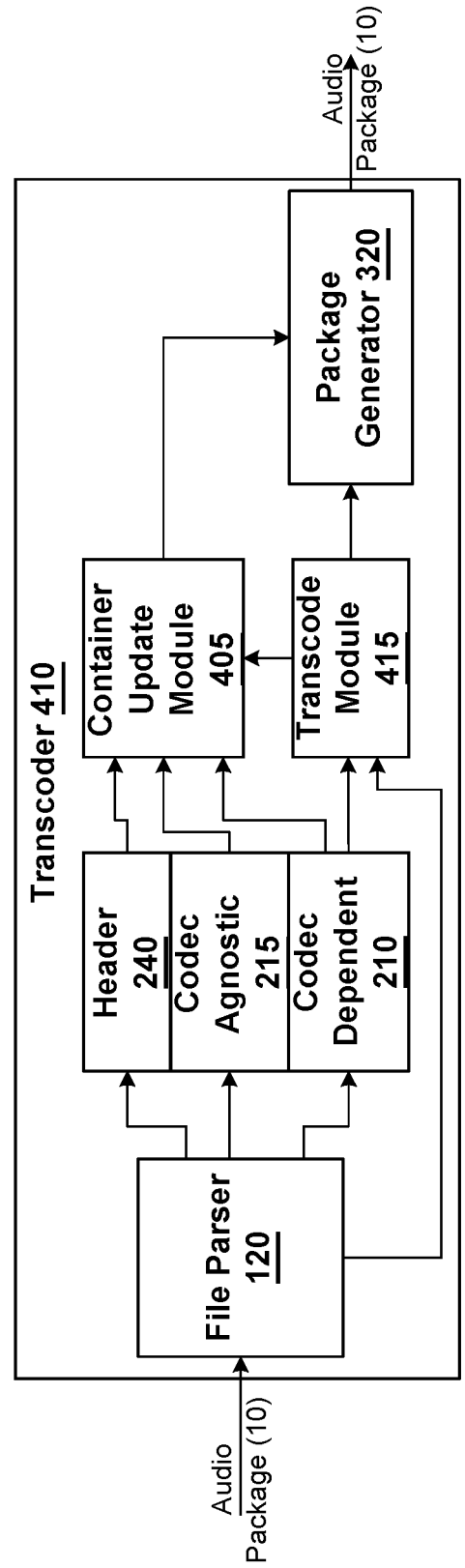
FIG. 4B illustrates a block diagram of a data flow for transcoding audio of an audio package according to an example implementation.

FIG. 4B illustrates a block diagram of a data flow for transcoding audio of an audio package according to an example implementation. As shown in FIG. 4B, the data flow includes a transcoder 410. The transcoder 410 includes the file parser 120, the header 240 block, the codec agnostic container 215 block, the codec dependent container 210 block, the container update module 405, the package generator 320, and a transcode module 415.

Conventional audio transcoders process all data and information associated with a compressed audio. Therefore, conventional transcodes can use a significant quantity of resources and risk improperly changing non-codec specific data and information associated with the compressed audio. Example implementations, only process the audio data to be transcoded and the codec dependent container 210 (e.g., the codec dependent data and information) associated with the audio data. Accordingly, the transcode module 415 can be configured to decompress audio data using a first codec and compress the audio data using a second codec. Further, the container update module 405 can be configured to update the codec dependent container 210 to the second codec. For example, a parameter 25 can represent the codec identification which can be changed to the second codec. Then, the package generator 320 can generate the audio package 10 as described above. The signal flow of FIG. 4B can be implemented in a software application configured to develop streaming audio and/or configured to playback streaming audio.

In an example implementation, parameters in the codec agnostic container 215 and/or the codec dependent container 210 may not be time aligned with the audio data. In other words, a parameter representing frame length can have different values indicating frames of different lengths. Further, the parameter representing frame length can be associated with a plurality of frames. In order to reference the frames (of different length), the codec agnostic container 215 and/or the codec dependent container 210 can include a parameter referencing timing information for the codec agnostic container 215 and/or the codec dependent container 210 and each of the plurality of frames.

Figure 5:
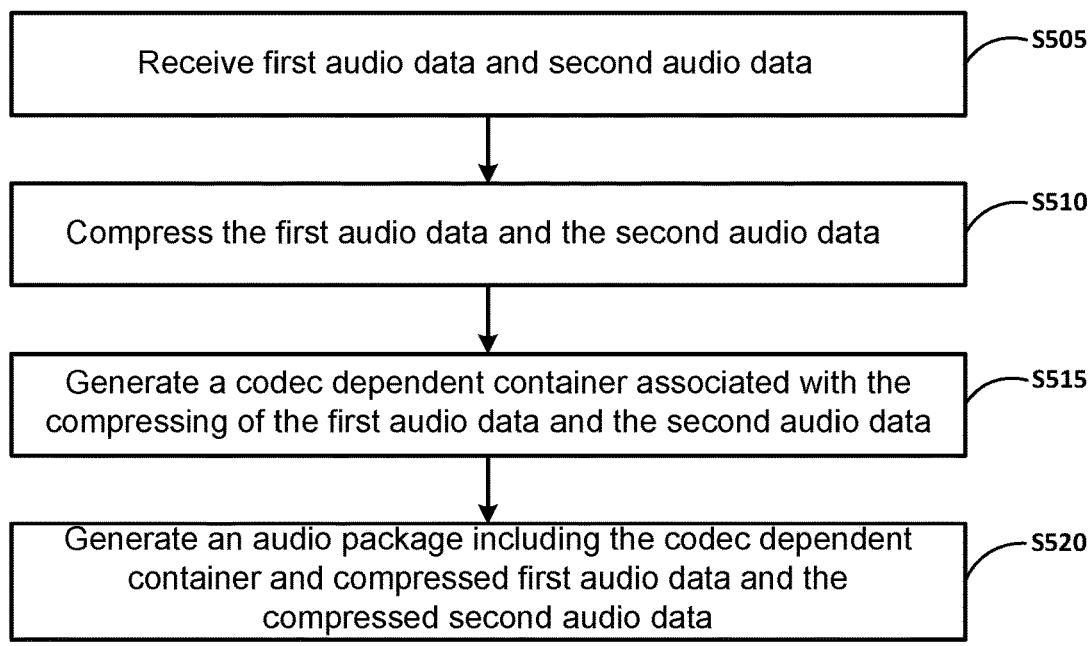
FIG. 5 illustrates a block diagram of a method for generating an audio package according to an example implementation.

Example 1. FIG. 5 illustrates a block diagram of a method for generating an audio package according to an example implementation. As shown in FIG. 5, in step S505 first audio data and second audio data is received. In step S510 the first audio data and the second audio data are compressed. In step S515 a first container associated with the first audio data and the second audio data are generated. The container can be associated with compressing the first audio data and the second audio data. Second containers can represent at least one parameter value including time-varying and/or non-time varying data associated with playback of the first audio data and the second audio data. In step S520 an audio package including an element including the compressed audio data and an identification corresponding to the compressed audio data and the containers is generated. The element can include a first element including the first compressed audio data and an identification corresponding to the first compressed audio data and a second element including the second compressed audio data and an identification corresponding to the second compressed audio data.

Example 2. The method of Example 1, wherein the first audio data can have a first frame size, the second audio data can have a second frame size, and the first frame size and the second frame size can be parameters included in the codec agnostic container.

Example 3. The method of Example 1, wherein the first audio data and the second audio data may not be sequential in time.

Example 4. The method of Example 3, wherein the codec agnostic container can include a parameter indicating a sequencing in time of the first audio data and the second audio data.

Example 5. The method of Example 1 can further include transcoding the compressed first audio data and updating the codec dependent container based on the transcoded first audio data.

Example 6. The method of Example 1, wherein the generating of the audio package can include generating a payload including the codec dependent container and the codec agnostic container, generating a header based on the payload, and generating the audio package including the header and the payload.

Example 7. The method of Example 1, wherein the audio package can include one of a link to the first compressed audio data or a link to the first compressed audio data and one of a link to the second compressed audio data or a link to the second compressed audio data.

Example 8. The method of Example 1, wherein the generating of the audio package can include merging a plurality of previously generated audio packages as the audio package.

Example 9. The method of Example 1, wherein the audio package can be a first audio package, the method can further include merging a second audio package with the first audio package.

Figure 6:
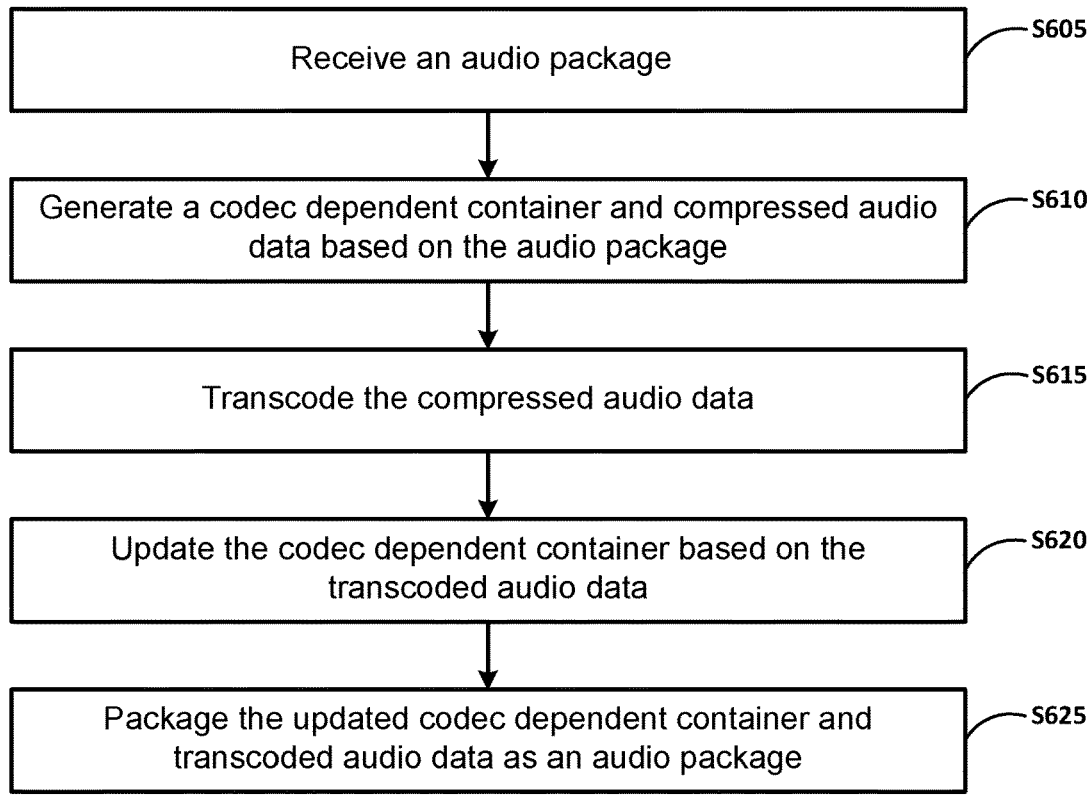
FIG. 6 illustrates a block diagram of a method for transcoding audio of an audio package according to an example implementation.

Example 10. FIG. 6 illustrates a block diagram of a method for transcoding audio of an audio package according to an example implementation. As shown in FIG. 6, in step S605 an audio package is received. In step S610 a container and compressed audio data based on the audio package is generated (e.g., parsed). In step S615 the compressed audio data is transcoded (e.g., decompressed and compressed using a different codec). In step S620 the container is updated based on the transcoded audio data. In step S625 the updated container and transcoded audio data is packaged as an audio package.

Figure 7:
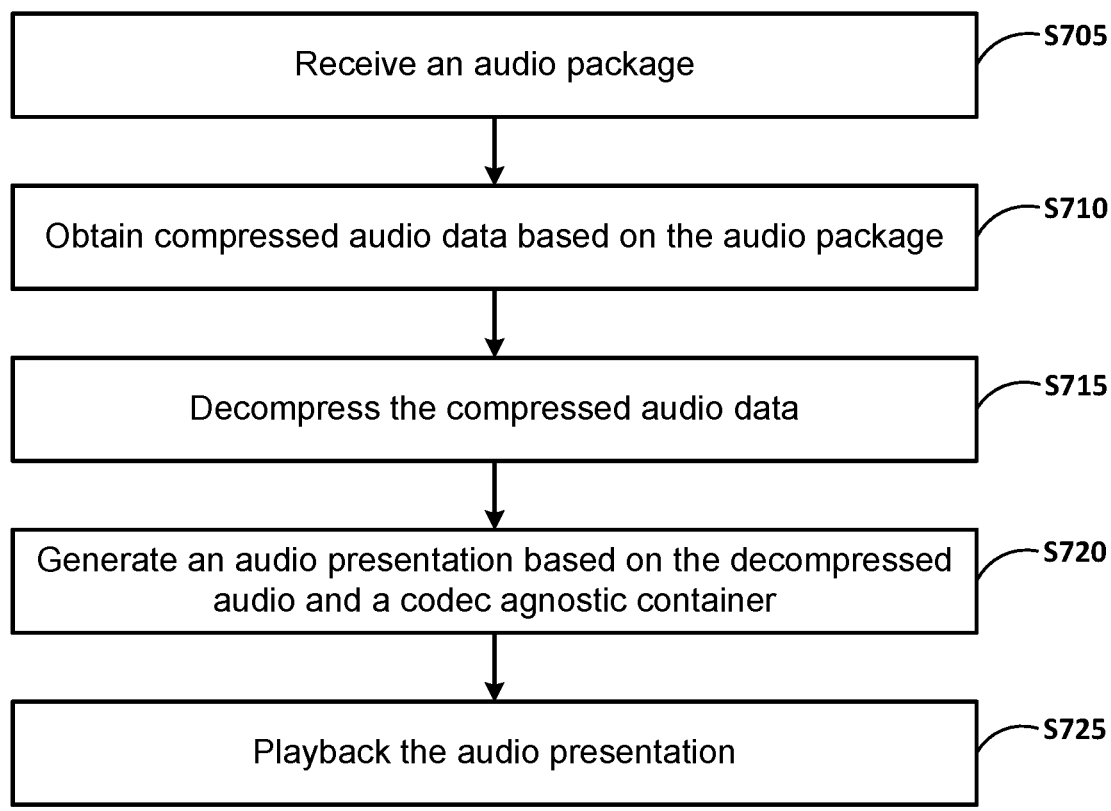
FIG. 7 illustrates a block diagram of a method for generating an audio presentation according to an example implementation.

Example 11. FIG. 7 illustrates a block diagram of a method for generating an audio presentation according to an example implementation. As shown in FIG. 7, in step S705 an audio package is received. The audio package can include a first identifier corresponding to first compressed audio data, a second identifier corresponding to second compressed audio data, and at least one container. The container can include parameters associated with compressing audio data and parameters representing time-varying and/or non-time varying data associated with playback of the first compressed audio data and the second compressed audio data. In step S710 the first compressed audio data is obtained using the first identifier and the second compressed audio data is obtained using the second identifier. In step S715 audio data is generated by decompressing the first compressed audio data and the second audio data based on a container (e.g., code dependent container). In step S720 an audio presentation is generated based on the decompressed audio and a container (e.g., code agnostic container). In step S725 the first audio data and the second audio data is played back based on the audio presentation.

Example 12. The method of Example 11, wherein the first audio data can have a first frame size, the second audio data can have a second frame size, and the first frame size and the second frame size can be parameters included in the codec agnostic container.

Example 13. The method of Example 11, wherein the first audio data and the second audio data may not be sequential in time.

Example 14. The method of Example 11, wherein the codec agnostic container can include a parameter indicating a sequencing in time of the first audio data and the second audio data.

Example 15. The method of Example 11 can further include updating a parameter included in the codec agnostic container.

Example 16. The method of Example 15, wherein the parameter included in the codec agnostic container can be updated using a playback device.

Example 17. The method of Example 11, can further include prior to generating first audio data, transcoding the compressed first audio data and updating the codec dependent container based on the transcoded first audio data.

Figure 8:
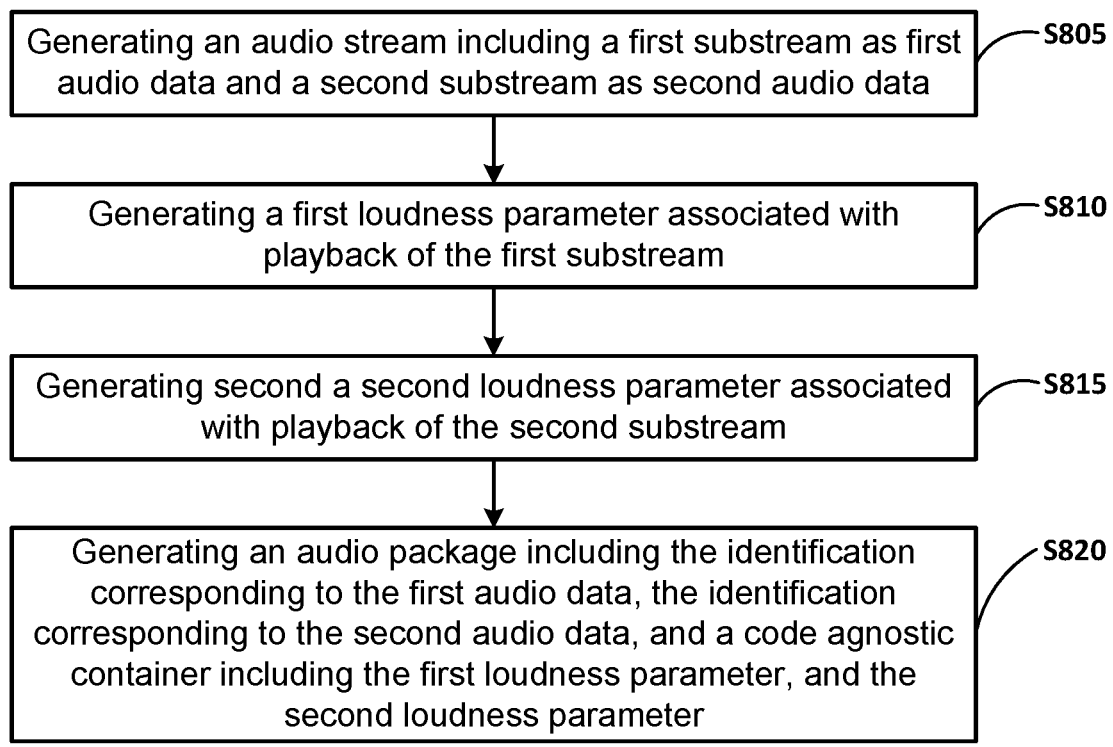
FIG. 8 illustrates a block diagram of a method for generating an audio package including loudness parameters according to an example implementation.

Example 18. FIG. 8 illustrates a block diagram of a method for generating an audio package including loudness parameters according to an example implementation. As shown in FIG. 8, in step S805 an audio stream including a first substream as first audio data and a second substream is generated as second audio data. In step S810 a first loudness parameter associated with playback of the first substream is generated. In step S815 a second loudness parameter associated with playback of the second substream is generated. In step S820 an audio package including the identification corresponding to the first audio data, the identification corresponding to the second audio data, and a codec agnostic container including the first loudness parameter and the second loudness parameter is generated.

Example 19. The method of Example 18, wherein the audio package can be a first audio package, the method can further include merging the first audio package with a second audio package to generate a third audio package, the second audio package including a third substream as third audio data and a third loudness parameter associated with playback of the third substream, generating a normalization parameter associated with playback of the first substream, the second substream, and the third substream, and adding the normalization parameter to the codec agnostic container.

Example 20. The method of Example 19, wherein the merging of the first audio package with the second audio package can include mixing the first substream, the second substream, and the third substream as a fourth substream, the normalization parameter can be a target loudness associated with playback of the fourth substream and the fourth substream can replace the first substream, the second substream, and the third substream in an audio presentation.

Example 21. The method of Example 20, wherein the mixing of the first substream, the second substream, and the third substream as a fourth substream can include determining a target sampling rate associated with playback of the first substream, the second substream, and the third substream, determining whether a sample rate associated with the first substream, the second substream, or the third substream differs from the target sampling rate, and in response to determining the sample rate associated with the first substream, the second substream, or the third substream differs from the target sampling rate, re-sampling the sampling rate of at least one of the first substream, the second substream, and the third substream.

Example 22. The method of Example 21, wherein at least one of the first substream, the second substream, and the third substream can be up-sampled to the target sampling rate, and at least one of the first substream, the second substream, and the third substream can be down-sampled to the target sampling rate.

Example 23. The method of Example 19 can further include determining a target sampling rate associated with playback of the first substream, the second substream, and the third substream, determining whether a respective sample rate associated with the first substream, the second substream, or the third substream differs from the target sampling rate, and in response to determining the sample rate associated with the first substream, the second substream, or the third substream differs from the target sampling rate, re-sampling the sampling rate of at least one of the first substream, the second substream, and the third substream.

Example 24. The method of Example 23, wherein re-sampling the sampling rate of at least one of the first substream, the second substream, and the third substream can include at least one of the first substream, the second substream, and the third substream is up-sampled to the target sampling rate, and at least one of the first substream, the second substream, and the third substream is down-sampled to the target sampling rate.

Example 25. The method of Example 21, wherein if the first substream is associated with a surround speaker and the second substream is associated with a top speaker, the first substream and the second substream can be separately mixed.

Example 26. A method can include any combination of one or more of Example 1 to Example 25.

Example 27. A non-transitory computer-readable storage medium comprising instructions stored thereon that, when executed by at least one processor, are configured to cause a computing system to perform the method of any of Examples 1-26.

Example 28. An apparatus comprising means for performing the method of any of Examples 1-26.

Example 29. An apparatus comprising at least one processor and at least one memory including computer program code, the at least one memory and the computer program code configured to, with the at least one processor, cause the apparatus at least to perform the method of any of Examples 1-26.

Figure 9:
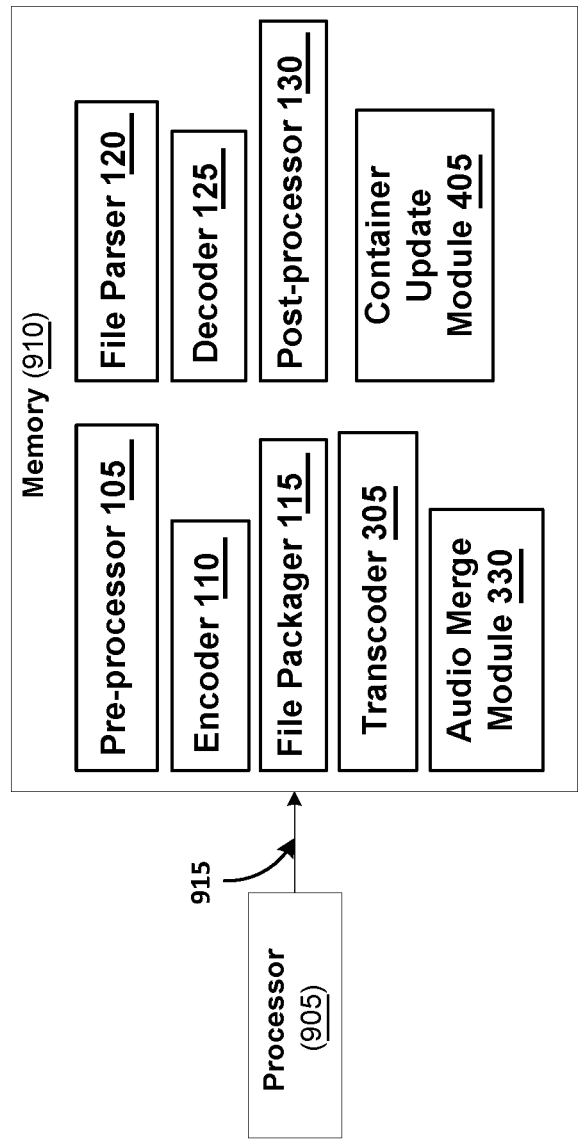
FIG. 9 shows an example of a computer device according to at least one example implementation.

FIG. 9 illustrates a block diagram of a system according to an example implementation. In the example of FIG. 9, the system (e.g., an augmented reality system, a virtual reality system, and/or any system configured to process a task (e.g., compress audio, video, images, convert text-to-voice, translate text, and the like) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 905 and a memory 910 (e.g., a non-transitory computer readable memory). The processor 905 and the memory 910 can be coupled (e.g., communicatively coupled) by a bus 915.

The processor 905 may be utilized to execute instructions stored on the at least one memory 910. Therefore, the processor 905 can implement the various features and functions described herein, or additional or alternative features and functions. The processor 905 and the at least one memory 910 may be utilized for various other purposes. For example, the at least one memory 910 may represent an example of various types of memory and related hardware and software which may be used to implement any one of the modules described herein.

The at least one memory 910 may be configured to store data and/or information associated with the device. The at least one memory 910 may be a shared resource. Therefore, the at least one memory 910 may be configured to store data and/or information associated with other elements (e.g., image/video processing or wired/wireless communication) within the larger system. Together, the processor 905 and the at least one memory 910 may be utilized to implement the techniques described herein. As such, the techniques described herein can be implemented as code segments (e.g., software) stored on the memory 910 and executed by the processor 905.

Accordingly, the memory 910 can include the preprocessor 105, the encoder 110, the file packager 115, the file parser 120, the decoder 125, audio merge module 330, the container update module 405, and the transcoder 410 each described in detail above. In example implementations, the components can be implemented in two or more systems having the same or similar resources as illustrated in FIG. 9. For example, a first system can be used to implement the preprocessor 105, the encoder 110, and the file packager 115, a second system can be used to implement the file parser 120, the decoder 125, and the transcoder 410, and/or a third system can be used to implement the transcoder 410.

The benefits associated with the implementations described above can include, at least, bitrate savings because information associated with compression/decompression and/or playback of multiple channels, streams, substreams and the like can be combined into fewer containers than prior techniques. The benefits associated with the implementations described above can include, at least, creator control over the timing of the automation data, enabling bitstream manipulations such as transcoding, merging and concatenation without requiring that automation data is additionally re-timed or re-partitioned which is not provided by prior techniques. The benefits associated with the implementations described above can include, at least, the use of a thin wrapping syntax to allow description of immersive audio to work both as a standalone format and facilitating integration of the audio into other container file formats, whereas prior techniques do not have this capability for immersive (e.g., 3D) audio.

Additional benefits can include enabling the containers to be interpreted as a codec. For example, the complete pipeline that processes a package to perform decoding, reconstruction of audio elements, rendering, mixing, and/or processing, can be viewed as one package that is done by a single process, system, and/or service. Prior techniques include pipelines that process packages separately. Additional benefits can include enabling the containers to be interpreted as a format. For example, the package can be transported inside of different existing containers or over existing transport formats, where the processing of the different packages can be done by different processes, systems, or services. Prior techniques do not have this capability.

Additional benefits can include enabling minimal and flexible transformation of the data representation when packaging a standalone sequence into a container, converting between containers, or extracting from containers. Prior techniques do not include processes for flexible transformation of data. Additional benefits can include facilitating bitstream manipulation. The bitstream manipulation can include, for example, merging and concatenation of one or more bitstreams, without requiring transcoding, where each bitstream may have different timing information such as audio frame sizes, automation data block intervals, and/or the synchronization of the timing information. Prior techniques require transcoding before merging and concatenation of bitstreams. Additional benefits can include enabling in-place decoding without requiring significant multiplexing and/or de multiplexing of the standalone format. Prior techniques do not have this capability.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
   receiving first audio data;
   receiving second audio data;
   compressing the first audio data as first compressed audio data;
   compressing the second audio data as second compressed audio data;
   generating a codec dependent container including a parameter associated with compressing of the first audio data, compressing of the second audio data, a reference to the first compressed audio data, and a reference to the second compressed audio data;
   generating a codec agnostic container, separate from the codec dependent container, including playback data for at least one of the first compressed audio data or the second compressed audio data, wherein the playback data is configured to be independent of a frame structure of the first compressed audio data or the second compressed audio data and including at least one parameter representing time-varying data associated with playback of the first audio data and with playback of the second audio data; and
   generating an audio package including the codec dependent container, the codec agnostic container, and at least one of the first compressed audio data or the second compressed audio data or reference to at least one of the first compressed audio data or the second compressed audio data.

2. The method of claim 1, wherein,
   the first audio data has a first frame size,
   the second audio data has a second frame size, the first frame size is different than the second frame size, and
   the first frame size and the second frame size are parameters included in the codec agnostic container.

3. The method of claim 1, wherein the first audio data and the second audio data are not sequential in time.

4. The method of claim 3, wherein the codec agnostic container includes a parameter indicating a sequencing in time of the first audio data and the second audio data.

5. The method of claim 1, further comprising:
   transcoding the first compressed audio data; and
   updating the codec dependent container based on the transcoded first compressed audio data.

6. The method of claim 1, wherein the generating of the audio package includes:
   generating a payload including the codec dependent container and the codec agnostic container;
   generating a header based on the payload; and
   generating the audio package including the header and the payload.

7. The method of claim 1, wherein the audio package includes:
   one of the first compressed audio data or the first compressed audio data; and
   one of the second compressed audio data or the second compressed audio data.

8. The method of claim 1, wherein the generating of the audio package includes merging a plurality of previously generated audio packages as the audio package.

9. The method of claim 1, wherein the audio package is a first audio package, the method further comprising:
   merging a second audio package with the first audio package.

10. A method comprising:
    receiving an audio package including:
      a first identifier corresponding to first compressed audio data,
      a second identifier corresponding to second compressed audio data,
      a codec dependent container including a parameter associated with compressing of the first compressed audio data, compressing of the second compressed audio data, a reference to the first compressed audio data, and a reference to the second compressed audio data, and
      a codec agnostic container, separate from the codec dependent container, the codec agnostic container including playback data for at least one of the first compressed audio data or the second compressed audio data, wherein the playback data is configured to be independent of a frame structure of the first compressed audio data or the second compressed audio data and including at least one parameter value including time-varying data associated with playback of the first compressed audio data and with playback of the second compressed audio data;
    obtaining the first compressed audio data using the first identifier;
    generating first audio data by decompressing the first compressed audio data based on the codec dependent container;
    obtaining the second compressed audio data using the second identifier;
    generating second audio data by decompressing the second compressed audio data based on the codec dependent container;
    generating an audio presentation based on the codec dependent container, and the codec agnostic container; and
    playing back the first audio data and the second audio data based on the audio presentation.

11. The method of claim 10, wherein,
    the first audio data has a first frame size, the second audio data has a second frame size, and the first frame size and the second frame size are parameters included in the codec agnostic container.

12. The method of claim 10, wherein the first audio data and the second audio data are not sequential in time.

13. The method of claim 12, wherein the codec agnostic container includes a parameter indicating a sequencing in time of the first audio data and a sequencing in time of the second audio data.

14. The method of claim 10, further comprising updating a parameter included in the codec agnostic container.

15. The method of claim 14, wherein the parameter included in the codec agnostic container is updated using a playback device.

16. The method of claim 10, further comprising:
    prior to generating first audio data, transcoding the first compressed audio data; and
    updating the codec dependent container based on the transcoded first compressed audio data.

17. A non-transitory computer-readable storage medium comprising instructions stored thereon that, when executed by at least one processor, are configured to cause a computing system to:
    receive first audio data;
    receive second audio data;
    compress the first audio data as first compressed audio data;
    compress the second audio data as second compressed audio data;
    generate a codec dependent container including a parameter associated with compressing of the first audio data, compressing of the second audio data, a reference to the first compressed audio data, and a reference to the second compressed audio data;
    generate a codec agnostic container, separate from the codec dependent container, including playback data for at least one of the first compressed audio data or the second compressed audio data, wherein the playback data is configured to be independent of a frame structure of the first compressed audio data or the second compressed audio data and including at least one parameter representing time-varying data associated with playback of the first audio data and with playback of the second audio data; and
    generate an audio package including the codec dependent container, the codec agnostic container, and at least one of the first compressed audio data or the second compressed audio data or reference to at least one of the first compressed audio data or the second compressed audio data.

18. The non-transitory computer-readable storage medium of claim 17, wherein,
    the first audio data has a first frame size,
    the second audio data has a second frame size, and
    the first frame size and the second frame size are parameters included in the codec agnostic container.

19. The non-transitory computer-readable storage medium of claim 17, wherein the first audio data and the second audio data are not sequential in time.

20. The non-transitory computer-readable storage medium of claim 17, wherein the generating of the audio package includes:
    generating a payload including the codec dependent container and the codec agnostic container;
    generating a header based on the payload; and
    generating the audio package including the header and the payload.

* * * * *